US011945173B2

United States Patent
Asakawa et al.

(10) Patent No.: US 11,945,173 B2
(45) Date of Patent: Apr. 2, 2024

(54) RESIN MEMBER MACHINING METHOD, RESIN MEMBER MACHINING APPARATUS, AND RESIN COMPONENT MANUFACTURING METHOD

(71) Applicants: Laser Systems Inc., Anan (JP); NICHIA CORPORATION, Anan (JP)

(72) Inventors: Yuichi Asakawa, Setagaya-ku (JP); Yasuyuki Tsuboi, Toyonaka (JP); Hiroaki Tamemoto, Anan (JP); Ryota Taoka, Komatsushima (JP); Minoru Yamamoto, Anan (JP)

(73) Assignees: LASER SYSTEMS INC., Anan (JP); NICHIA CORPORATION, Anan (JP)

( * ) Notice: Subject to any disclaimer, the term of this patent is extended or adjusted under 35 U.S.C. 154(b) by 0 days.

(21) Appl. No.: 17/847,928

(22) Filed: Jun. 23, 2022

(65) Prior Publication Data
US 2022/0324180 A1    Oct. 13, 2022

Related U.S. Application Data

(63) Continuation of application No. PCT/JP2020/045504, filed on Dec. 7, 2020.

(30) Foreign Application Priority Data

Dec. 27, 2019    (JP) .................................. 2019-239647

(51) Int. Cl.
*B29C 65/16*    (2006.01)
*B29C 65/00*    (2006.01)

(52) U.S. Cl.
CPC .... *B29C 65/1609* (2013.01); *B29C 66/91221* (2013.01); *B29C 66/952* (2013.01)

(58) Field of Classification Search
CPC ............ B29C 65/1664; B29C 65/1609; B29C 66/91221; B29C 66/41
See application file for complete search history.

(56) References Cited

U.S. PATENT DOCUMENTS

2011/0200802 A1*    8/2011    Li ....................... B29C 65/1667
                                                                    156/272.8
2013/0098547 A1    4/2013    Matsuo et al.
(Continued)

FOREIGN PATENT DOCUMENTS

DE    37 14 504 A1    11/1988
DE    3714504 A    * 11/1988    ............. B23K 26/06
(Continued)

OTHER PUBLICATIONS

Machine Translation of DE3714504A (Year: 1988).*
(Continued)

*Primary Examiner* — Daniel McNally
(74) *Attorney, Agent, or Firm* — Foley & Lardner LLP

(57) ABSTRACT

A method for processing a resin member includes: irradiating a first member comprising a resin with first light of a first wavelength that causes electronic excitation of the resin; and irradiating the resin electronically excited through irradiation with the first light with second light of a second wavelength longer than the first wavelength. A wavelength range of the second wavelength is within a wavelength range in which light absorption of the resin increases through electronic excitation of the resin.

25 Claims, 6 Drawing Sheets

(56) References Cited

U.S. PATENT DOCUMENTS

2014/0332157 A1    11/2014   Arai et al.
2018/0111327 A1*   4/2018   Watanabe ........... B29C 66/3492

FOREIGN PATENT DOCUMENTS

| EP | 0 365 754 A1 | | 5/1990 | |
|---|---|---|---|---|
| JP | 2005-007665 A | | 1/2005 | |
| JP | 2005007665 A | * | 1/2005 | ......... B29C 65/1635 |
| JP | 2005161620 A | * | 6/2005 | ......... B29C 65/1635 |
| JP | 2005-305470 A | | 11/2005 | |
| JP | 2005-313475 A | | 11/2005 | |
| JP | 2012-027447 A | | 2/2012 | |
| JP | 2012-062187 A | | 3/2012 | |
| JP | 2013-119111 A | | 6/2013 | |
| JP | 2017-164986 A | | 9/2017 | |
| WO | WO-2013/084758 A1 | | 6/2013 | |
| WO | WO-2017/145269 A1 | | 8/2017 | |

OTHER PUBLICATIONS

International Search Report with English language translation and Written Opinion of the International Searching Authority dated Jan. 12, 2021 in the corresponding International Patent Application No. PCT/JP2020/045504; 8 pages.

* cited by examiner

RESIN MEMBER MACHINING METHOD, RESIN MEMBER MACHINING APPARATUS, AND RESIN COMPONENT MANUFACTURING METHOD

CROSS-REFERENCE TO RELATED APPLICATIONS

This is a bypass continuation of PCT Application No. PCT/JP2020/045504, filed on Dec. 7, 2020, which claims priority to Japanese Patent Application No. 2019-239647, filed on Dec. 27, 2019. The contents of these applications are hereby incorporated by reference in their entireties.

BACKGROUND

The present disclosure relates to a processing method for a resin member, a processing apparatus for a resin member, and a method of manufacturing a resin component.

In recent years, in the field of electronic components and devices, apparatuses and devices in which not only inorganic materials such as semiconductor and metal, but also organic materials (resins) are partially introduced to utilize their functions have attracted attention. For manufacture of such apparatuses and devices, it is necessary to join a member including a resin to other members, and to perform precise processing (cutting, forming grooves, etc.) on the member including the resin.

A method for processing a member including a resin, a laser welding method has attracted attention (see, for example, Japanese Patent Pub. No. 2012-27447). In the laser welding method, at least one of two or more members (at least one of them including resin) is irradiated with near-infrared or infrared laser light. At the portion irradiated with the laser light, the temperature of the resin increases to the glass transition temperature or greater due to the photothermal effect. Then, the plurality of members is joined by bringing the melted resin of the member irradiated with the laser light and the other member into intimate contact with each other.

Note that in the related art, a resin member is locally heated through irradiation with near-infrared or infrared laser light such that the resin member is cut at a desired position or that a groove is formed at a desired position in the resin member.

SUMMARY

To heat resins through irradiation with laser light, it is necessary to irradiate the resin with laser light of the wavelength range that can be absorbed by the resin. However, general-purpose resins (e.g., polystyrene (hereinafter referred to as "PS"), polymethylmethacrylate (hereinafter referred to as "PMMA"), polyethylene terephthalate (hereinafter referred to as "PET"), and polycarbonate (hereinafter referred to as PC)) normally do not have absorption in the visible light range. For example, PET does not have substantial light absorption in a wide wavelength range of 400 nm to 2200 nm. Also, polycarbonate does not have substantial light absorption in a wide wavelength range of 400 nm to 1600 nm. Therefore, to process PET and polycarbonate, it is necessary to irradiate them with laser light with a wavelength longer than the above-mentioned wavelengths.

Further, the light absorption coefficient of resin in the near-infrared range (wavelengths of approximately 800 nm to 2 μm) is extremely small. Therefore, even when resin is irradiated with laser light of the near-infrared range with a high light intensity, saturation of absorption (hereinafter referred to as "absorption saturation") is easily caused. Consequently, it is difficult to cause the resin to absorb light energy greater than the threshold value. As such, heating of resin using near-infrared or infrared laser light (light heat reaction) has room for improvement.

Embodiments of the present invention have been developed in consideration of such circumstances. Specifically, an object of certain embodiments of the present invention is to provide a method of processing a resin member by efficiently increasing the temperature of a member including a resin through light irradiation. Further, another object of certain embodiments of the present invention is to provide a processing apparatus for a resin member and a method of manufacturing a resin component, for performing the above-described processing.

Certain embodiments of the present invention provide the following processing method for a resin member.

A processing method for a resin member includes: irradiating a first member including a resin with first light of a first wavelength that causes electronic excitation of the resin; and irradiating the resin electronically excited through irradiation with the first light, with second light of a second wavelength longer than the first wavelength, wherein a wavelength range of the second wavelength is within a wavelength range in which a light absorption of the resin increases through electronic excitation of the resin.

Other embodiments of the present invention provide the following processing apparatus for a resin member.

A processing apparatus for a resin member includes: a first light irradiation system configured to irradiate a resin of a first member including the resin with a first light of a first wavelength that causes electronic excitation of the resin; and a second light irradiation system configured to irradiate the resin of the first member with second light of a second wavelength longer than the first wavelength, wherein a wavelength range of the second wavelength is within a wavelength range in which a light absorption of the resin increases through electronic excitation of the resin.

Other embodiments of the present invention provide the following a method of manufacturing a resin component.

A processing method for a resin component includes: irradiating a first member including a resin with first light of a first wavelength that causes electronic excitation of the resin; and irradiating the resin electronically excited through irradiation with the first light, with second light of a second wavelength longer than the first wavelength, wherein a wavelength range of the second wavelength is within a wavelength range in which a light absorption of the resin increases through electronic excitation of the resin.

According to certain embodiments of the processing method for a resin member, a member including a resin can be processed by sufficiently increasing the temperature of the member through light irradiation.

Further, according to certain embodiments of the processing apparatus for a resin member, resin can be processed by irradiating a desired region with two or more types of light.

Further, according to certain embodiments of the method of manufacturing a resin component, a resin component can be manufactured by sufficiently increasing the temperature of a member including a resin through light irradiation.

DETAILED DESCRIPTION

Figure 1:
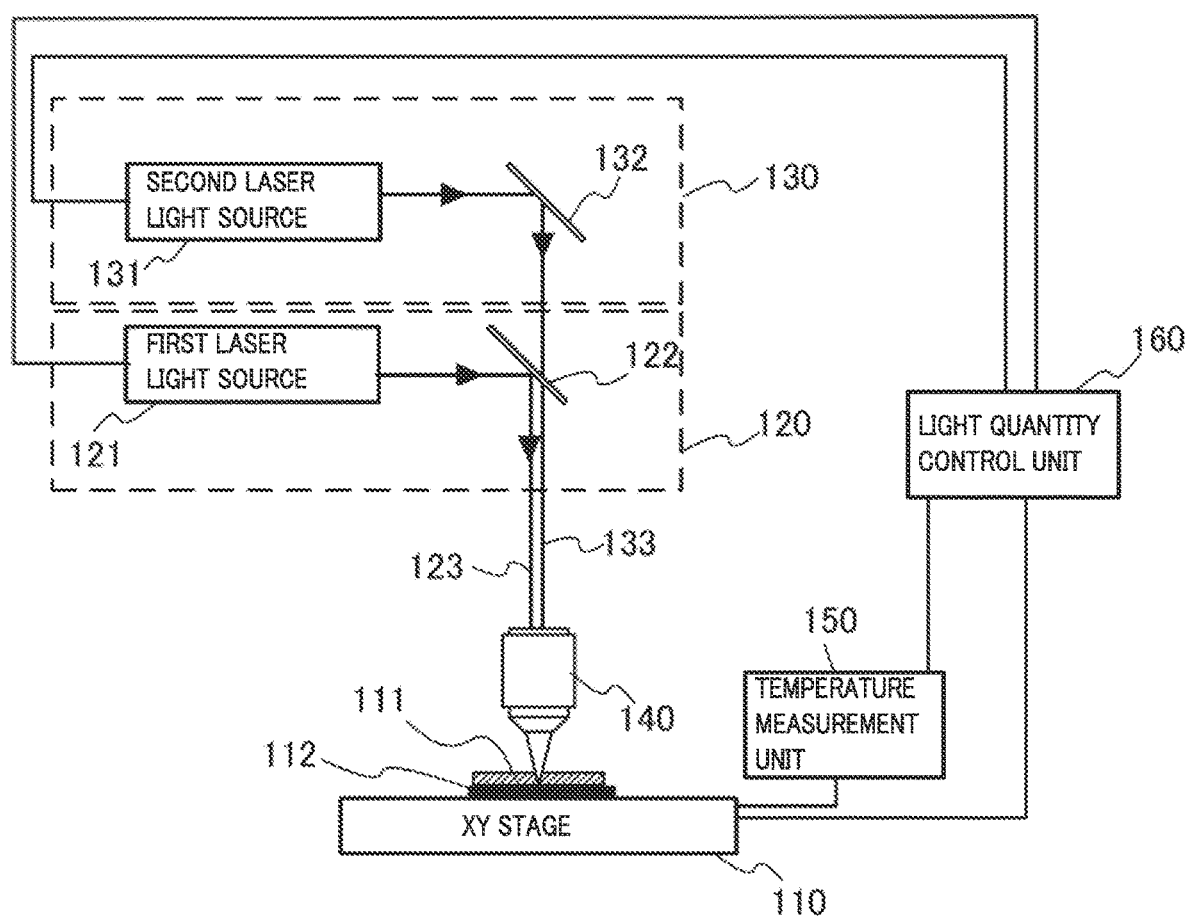
FIG. 1 is a schematic view illustrating an exemplary processing apparatus for a resin member of an embodiment of the present invention.

Certain embodiments of the present invention relate to a processing method for a resin member, a processing apparatus for a resin member used for the processing method, and a method of manufacturing a resin component using the processing method. Examples of a processing method for a member, a processing apparatus, and a method of manufacturing a resin component are described below, but the present invention is not limited to the described embodiments.

1. Processing Method for Resin Member

A processing method for a resin member according to an embodiment of the present invention includes a step of irradiating a first member including a resin with first light of a first wavelength that causes electronic excitation of the resin (first light irradiation step), and a step of irradiating the resin electronically excited by the irradiation with the first light with second light of a second wavelength longer than the first wavelength (second light irradiation step). Note that the above-mentioned second wavelength is a wavelength within the wavelength range in which the light absorption of the resin increases through the electronic excitation of the resin.

As described above, in the method of causing vibrational excitation of resin by irradiating the resin with near-infrared light and/or infrared light, absorption saturation is easily caused and it is difficult to sufficiently increase the temperature of the resin.

In view of this, in the present embodiment, the resin of the first member to be processed is electronically excited through irradiation with the first light of the first wavelength. The electronic excitation is excitation of electrons in the chromophore of the polymer that is the resin, and is electronic excitation mainly corresponding to Π-Π* transition or Π-Π* transition. Electronic excitation of resin generates a wavelength range in which the light absorption increases. In view of this, in the present embodiment, the irradiation is further performed with the second light of the second wavelength within the wavelength range in which the light absorption increases. Through the irradiation of the resin with the second light, the temperature of the resin is sufficiently increased, and the first member can be processed. Note that in the present specification, it suffices that the wavelength range in which the light absorption of the resin increases is a wavelength range in which the light absorption of the resin increases than before the irradiation with the first light, and this wavelength range includes a wavelength range that has no light absorption before the irradiation with the first light but exhibits light absorption after the irradiation with the first light.

The wavelength range in which the light absorption increases through the electronic excitation of the resin includes two types. The first wavelength range in which the light absorption increases is a wavelength range located on the longer wavelength side than the first wavelength (first light) for electron transition of the resin, and is a wavelength range in which the light absorption increases when the temperature of resin is increased through the electronic excitation. This wavelength range is also called hot band, and is described by Urbach rule.

The Urbach rule is that shape A on the low energy side (long wavelength side) in the light absorption spectrum of a material is represented by the following equation.

$$A(E,t) = A_0 \exp(\sigma(E_0)/kT) \quad \text{[Equation 1]}$$

In the equation, $A_0$ represents proportional constant, and σ represents steepness factor. σ represents a value close to 1. E represents a photon energy of light absorbed by a material, and is expressed by $E=h(c/\lambda)$. The photon energy of the light correlates with wavelength λ of absorbed light. Note that in the equation, h represents Planck's constant, and c represents the speed of light. In addition, $E_0$ represents an energy level of a material, k represents Boltzmann's constant, and T represents absolute temperature.

According to the above-mentioned Urbach rule, along with the temperature rise of the material, the low energy side end of the light absorption spectrum moves to the long wavelength side. Then, light absorption is caused even in the wavelength range that has no or small absorption when it is at the low temperature. That is, when the resin is electronically excited through the irradiation with the first light as in the present embodiment, the temperature of the resin increases, and the light absorption also increases in a wavelength range on the longer wavelength side than the normal light absorptive wavelength range in the resin.

The second wavelength range in which the light absorption increases is a wavelength range located on a longer wavelength side of the first wavelength (first light) for electron transition of the resin, and is a wavelength range in which the light absorption increases due to the excited triplet state that transiently appears through the electronic excitation.

There are many organic materials that do not have light absorption in the visible light range in the ground state, but have absorption in the visible light range in the excited state, with a large absorption coefficient. For example, Norimasa Fukazawa et al., "Diffuse reflectance laser photolysis and luminescence study on poly(ethylene terephthalate) powder," The Journal of Physical Chemistry 1993, volume 97, pages 6753 to 6759 (American Chemical Society) ("Fukazawa") discloses a light absorption spectrum of PET in an excited triplet state. As described above, PET in the ground state does not have light absorption in a wavelength of 400 nm to 2200 nm. Fukazawa discloses, however, that when PET is set to the excited triplet state, it has a light absorption band in a wavelength of 390 nm to 550 nm.

In addition, Yubai Bi et al., "A Visible Light Initiating System for Free Radical Promoted Cationic Polymerization," Macromolecules, Vol. 27, No. 14, 1994 (American Chemical Society) ("Bi") discloses a light absorption spectrum of polycarbonate in the excited triplet state. Bi discloses that polycarbonate in the ground state does not have light absorption in a wavelength of 400 nm to 1600 nm. Bi discloses, however, that when polycarbonate is set to the excited triplet state, it has a light absorption band in a wavelength of 350 nm to 500 nm. That is, when the resin is electronically excited through the irradiation with the first light as in the present embodiment, the resin is set to the excited triplet state, and normally, a new light absorptive wavelength range appears on the longer wavelength side than the light absorptive wavelength range of the re sin.

A processing method for a resin member of the present embodiment is applicable to a method of heating and processing a first member including a resin, and is applicable to various methods. For example, it is applicable to a method of joining a first member including a resin, and another member. In addition, it is also applicable to a method of cutting a first member including a resin or forming a groove in it, and the like. A first light irradiation step, a second light irradiation step, and a joining step of the present embodiment are described with a method of joining a first member including a resin and a second member as an example, the processing method of the present embodiment is not limited to the joining method.

First Light Irradiation Step

In this step, the first member including the resin is irradiated with the first light of the first wavelength. It suffices that the resin included in the first member is a resin that can be electronically excited through irradiation with light (first light), and examples of the resin included in the first member include polyethylene terephthalate (PET), polystyrene, polymethylmethacrylate (PMMA) and polycarbonate (PC). Note that the resin may not have absorption through the electronic excitation for the wavelength (second wavelength) of the second light described later described later.

Among the above-mentioned resins, polyethylene terephthalate (PET), polycarbonate (PC), or polymethylmethacrylate (PMMA) are preferable from the view point of the ease of electronic excitation through the irradiation with the first light, and the ease of the increase of light absorption on the long wavelength side. Note that it suffices that the first member includes resin at least in the region joined to the second member described later, and the first member may include components other than resin.

In addition, the shape of the first member is not limited, and may be a plate shape or a three-dimensional structure, for example. In addition, the joint surface between the first member and the second member may be a flat surface or a curved surface.

The transmissivity of the first member to the light (first light and second light) is appropriately selected in accordance with the irradiation direction of the light (first light and second light). For example, when the irradiation with the first light and the second light is performed from the side of the joint surface with the second member in the first member, the first member may not have transmissivity to the first light and the second light. On the other hand, when the irradiation with the first light and the second light is from the side opposite to the joint surface with the second member in the first member, it is preferable that the first member has transmissivity to the first light and the second light.

It suffices that the wavelength (first wavelength) of the first light for the irradiation in this step is a wavelength that can electronically excite the resin in the first member, and the wavelength is appropriately selected in accordance with the type of the resin. For example, in the case of polyethylene terephthalate (PET), polycarbonate (PC) and the like, it is preferable that the wavelength range of the first wavelength be 410 nm or less, and laser light of a wavelength of 375 nm and laser light of a wavelength of 405 nm may be adopted, for example.

Laser light is particularly preferable as the first light. When the first light is laser light, its irradiation area can be controlled in an extremely small size, and the irradiation with the first light can be performed in a precision pattern. Note that the laser light may be continuously oscillated laser light, or pulse-oscillated laser light. Continuously oscillated laser light is more preferable from the view point of the capability to continuous irradiation with the first light in a desired region.

In addition, at this time, the output from the laser light source is preferably in a range of 10 to 500 mW. For example, in the case of polyethylene terephthalate (PET), a range of 100 to 400 mW is more preferable. For example, in the case of polycarbonate (PC), a range of 30 to 250 mW is preferable, and a range of 30 to 200 mW is more preferable. For example, in the case of polymethylmethacrylate (PMMA), a range of 100 to 400 mW is more preferable. Through the irradiation with the first light at this output, the resin can be efficiently electronically excited. In addition, the light intensity of the first light at the light focusing position is preferably 0.01 $kW/cm^2$ or greater, more preferably in a range of 0.01 $kW/cm^2$ to 1.00 $kW/cm^2$.

Further, the cumulative light quantity of the first light at the light focusing position of the first light is preferably in a range of 0.2 to 35.0 m $J/cm^2$. When the cumulative light quantity of the first light is within this range, the above-described excited triplet state can be generated and the above-described hot band can be generated by sufficiently increasing the temperature of the resin through the electronic excitation.

Note that the temperature of the first light irradiated region may be measured during the irradiation with the first light, and the intensity of the first light may be adjusted in accordance with the temperature.

Second Light Irradiation Step

In this step, the resin electronically excited by the irradiation with the first light is irradiated with second light of a second wavelength longer than that of the first light. It suffices that the timing of the irradiation with the second light is a timing during which the resin is electronically excited by the irradiation with the first light, and normally, it is preferable to perform the irradiation with the second light simultaneously with the irradiation with the first light, while the timing may be slightly shifted from the irradiation with the first light.

It suffices that the wavelength (second wavelength) of the second light for the irradiation in this step is a wavelength longer than the first wavelength, and is a wavelength within the wavelength range in which the light absorption of the resin increases through the electronic excitation of the resin. As described above, the wavelength range in which the light absorption increases through the electronic excitation of the resin is a wavelength range located on the longer wavelength side than the first wavelength (the first light), and a wavelength range in which the light absorption increases when the temperature of the resin is increased through the electronic excitation. In addition, as described above, the wavelength range in which the light absorption increases through the electronic excitation of the resin is a wavelength range located on the longer wavelength side than the first wavelength (the first light), and a wavelength range in which the light absorption increases due to the excited triplet state that transiently appears through the electronic excitation. The second light may be light of a wavelength within any of the above-mentioned wavelength ranges.

Figure 2A:
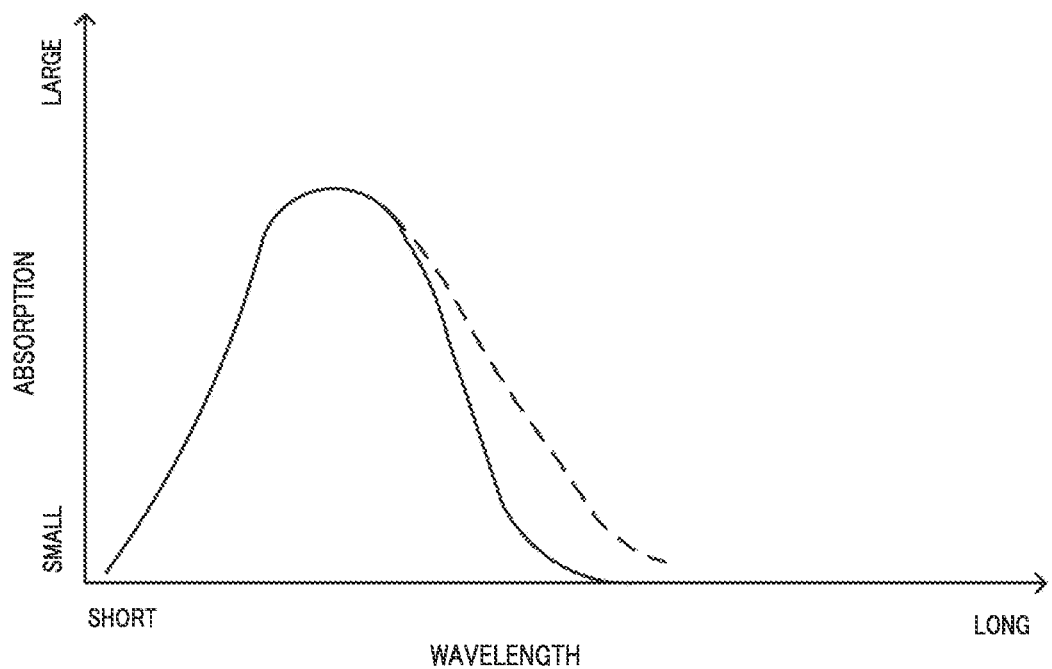
FIG. 2A is a diagram schematically illustrating a wavelength range in which light absorption increases when the temperature of resin is increased through electronic excitation.
Figure 2B:
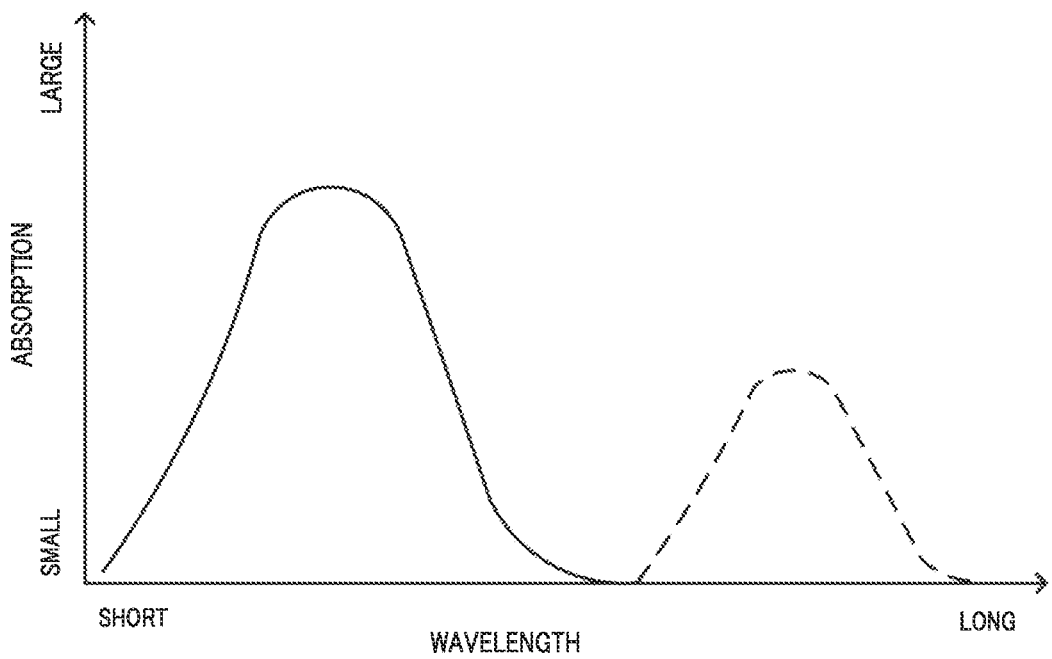
FIG. 2B is a diagram schematically illustrating a wavelength range in which light absorption increases due to the excited triplet state that transiently appears through the electronic excitation.

The wavelength range that is located on the longer wavelength side than the first wavelength (the first light) and is a range in which the light absorption increases when the temperature of the resin is increased through the electronic excitation is, for example, the wavelength range indicated with the broken line in FIG. 2A. In addition, the wavelength range that is located on the longer wavelength side than the first wavelength (the first light) and is a range in which the light absorption increases due to the excited triplet state that transiently appears through the electronic excitation is, for example, the wavelength range indicated with the broken line in FIG. 2B. In FIGS. 2A and 2B, the wavelength range indicated with the solid line is the intrinsic absorption wavelength range of the resin.

The wavelength range in which the light absorption of the resin increases through the electronic excitation of the resin differs depending on the type of the resin. In view of this, the second wavelength is appropriately selected in accordance with the type of the resin. For example, in the case of polyethylene terephthalate (PET), polycarbonate (PC) and the like, the wavelength range of the second wavelength is preferably greater than 400 nm and equal to or less than 550 nm, and, for example, laser light of a wavelength of 405 nm, laser light of a wavelength of 450 nm or the like may be adopted.

The second light is also preferably laser light. When the second light is laser light, its irradiation area can be controlled in an extremely small size, and the irradiation with the second light can be performed in a precision pattern. Note that the laser light may be continuously oscillated laser light, or pulse-oscillated laser light. Continuously oscillated laser light is more preferable from the view point of the capability to continuous irradiation with the second light in a desired region.

In addition, at this time, the output from the laser light source is preferably in a range of 30 to 1200 mW. For example, in the case of polyethylene terephthalate (PET), a range of 100 to 1000 mW is more preferable. For example, in the case of polycarbonate (PC), a range of 50 to 500 mW is more preferable. For example, in the case of polymethylmethacrylate (PMMA), a range of 100 to 500 mW is more preferable. Through the irradiation with the second light at the above-described outputs, the temperature of the resin in the first member can be efficiently increased. In addition, the light intensity at the light focusing position of the second light is preferably 0.01 $kW/cm^2$ or greater, more preferably in a range of 0.01 $kW/cm^2$ to 2.00 $kW/cm^2$.

Further, it suffices that the cumulative light quantity of the second light at the light focusing position is the quantity of light that can heat the first member (resin) to a temperature equal to or greater than the glass transition temperature of the resin in the first member. For example, the temperature is preferably in a range of 0.2 to 65.0 m $J/cm^2$. When the cumulative light quantity of the second light is within this range, the temperature of the resin is sufficiently increased and the first member and the second member can be easily firmly joined.

The irradiation with the second light may be performed from the same axial direction as the first light, or from a different direction. In addition, also in this step, the temperature of the region irradiated with the second light (and the first light) may be measured, and the intensity of the second light may be adjusted in accordance with the temperature.

Joining Step

The joining step is a step of joining the region (resin) irradiated with the first light and the second light in the first member, and the second member. Note that the joining step may be performed after the first light irradiation step and the second light irradiation step are performed on the first member. Specifically, the first member may be overlaid on and joined with the second member that is separately prepared (prepared by a preparation step) after the temperature of the resin in the first member is sufficiently increased through the first light irradiation step and the second light irradiation step performed on the first member.

On the other hand, the joining step may be performed simultaneously with the first light irradiation step and the second light irradiation step (especially, simultaneously with the second light irradiation step). In the case where the joining step, the first light irradiation step and the second light irradiation step are simultaneously performed, the first light irradiation step, the second light irradiation step, and the joining step can be simultaneously performed by disposing the first member and the second member in an overlaid manner in advance, and focusing the first light and the second light at their interface.

Note that in the joining step, the first member and the second member may be pressed against each other as necessary.

The type of the second member is not limited as long as the component can be joined with the first member, and is appropriately selected in accordance with the purpose. For example, it may be the same resin as the first member, or may be a different resin. Note that in the case where a resin is included in the second member, not only the temperature of the resin in the first member, but also the temperature of the resin in the second member may be increased through the irradiation with the first light and/or the second light. On the other hand, the second member may be an inorganic substance such as metal and ceramic.

The shape of the second member is also not limited, and may be a plate shape, or a three-dimensional structure, for example. In addition, the joint surface of the second member with the first member may be a flat surface or a curved surface.

The transmissivity of the second member to the light (the first light and the second light) is appropriately selected in accordance with the timing of the joining step, and/or the irradiation direction of the light (the first light and the second light). For example, in the case where the first light irradiation step and/or the second light irradiation step is not simultaneously performed with the joining step, the second member may not have transmissivity to the first light and the second light. In addition, even in the case where the first light irradiation step and/or the second light irradiation step is performed in the state in which the first member and the second member are overlaid on each other, the second member may not have transmissivity to the first light and the second light when the irradiation with the first light and the second light is performed from the first member side. On the other hand, in the case where the first light irradiation step and/or the second light irradiation step is performed in the state in which the first member and the second member are overlaid on each other, and the irradiation with the first light and the second light is performed from the second member side, it is preferable that the second member have transmissivity to the first light and the second light.

Other Point

In the description above, the irradiation with light of two wavelength types, namely, the first light and the second light, is described. Note that in the present embodiment, irradiation with light of three wavelength types may be performed. For example, the temperature of the resin in the first member can be further efficiently increased through irradiation with the second light of the wavelength corresponding to the hot band generated by the irradiation with the first light, and further, irradiation with third light of the wavelength corresponding to the absorption wavelength range of the excited triplet state generated by the irradiation with the first light.

In addition, while the method of joining the first member and the second member through the irradiation with the first light is described above, the present embodiment may adopt a method in which the first member is cut into a desired shape by melting a desired portion of the first member, and a desired recess and the like are formed by heating a part of the first member, for example.

In addition, in the description above, the resin included in the first member is electronically excited through the irradiation with the first light, and the irradiation with the second light included in the wavelength range in which the light absorption of the resin increases through the electronic excitation is performed. Note that in the present embodiment, it is possible to perform irradiation with the second light of the second wavelength included in the wavelength range in which the light absorption of the resin increases due to the light absorption of the first light in the first member when irradiated with the first light.

Effect

In the above-described method, the resin is electronically excited by the first light, and the irradiation with the second light included in the wavelength range in which the light absorption increases through the electronic excitation is performed. In this manner, through the irradiation with a combination of the light of two wavelength types that can be absorbed by the resin, the resin can absorb a large amount of light energy and the resin can be heated efficiently. Further, the laser light of a relatively short wavelength such as laser light of a wavelength of 375 nm and laser light of a wavelength of 405 nm, used as the first light, can reduce the irradiation range in comparison with laser light of a relatively long wavelength such as near-infrared and infrared, and thus can increase the irradiation accuracy of the laser light. Thus, elaborate processing can be performed than when the resin member is processed using laser light of a relatively long wavelength such as near-infrared and infrared.

In addition, the light absorption of the resin in the wavelength range in which the light absorption increases through the electronic excitation can be far greater than the light absorption of the first light in some cases. Accordingly, with the above-described method, through the irradiation with the second light, the resin can absorb an extremely large light energy, and as a result the temperature of the resin can be efficiently increased.

Further, in general, the emission wavelength of a high output type laser light irradiation system is normally in a range of 400 to 1600 nm. In addition, in general, a laser light irradiation system whose emission wavelength is 400 nm or less has a small output in order to avoid the internal damage due to its short wavelength. With the above-described method, the second wavelength of the second light may be set to greater than 400 nm. Thus, a high output type laser light irradiation system may also be used.

2. Processing Apparatus

The above-described processing method can be implemented by a processing apparatus described below including a first light irradiation system configured to perform irradiation with the first light of the first wavelength and a second light irradiation system configured to perform irradiation with the second light of the second wavelength. Note that the apparatus for implementing the above-mentioned processing method is not limited to this apparatus. In addition, while an apparatus that joins the first member and the second member is described below, the processing apparatus may be a shaving or cutting apparatus for the first member, or the like, for example.

FIG. 1 is a diagram illustrating an exemplary processing apparatus according to the present embodiment. As illustrated in FIG. 1, processing apparatus 100 includes an XY stage for placing first member 111 and second member 112, first light irradiation system 120, second light irradiation system 130, lens 140, temperature measurement unit 150, and light quantity control unit 160. Note that as necessary, a position control unit (not illustrated) and a supporting unit (not illustrated) for controlling the relative position of first member 111 and second member 112 may be included.

First light irradiation system 120 is a light irradiation system for irradiation with first light 123, and may include first laser light source 121 and first mirror (dichroic mirror) 122, for example.

The first laser light source 121 may be, for example, a laser that outputs laser light of a wavelength of 375 nm and laser light of a wavelength of 405 nm, or the like.

Second light irradiation system 130 is a light irradiation system for irradiation with second light 133, and may include second laser light source 131 and second mirror 132, for example. Second laser light source 131 may be, for example, a laser that outputs laser light of a wavelength of 405 nm and laser light of a wavelength of 450 nm, or the like.

Any appropriate type of lens 140 can be employed as long as first light 123 emitted from first light irradiation system 120 and second light 133 emitted from second light irradiation system 130 can be focused at contact portions of first member 111 and second member 112. Its light focusing spot diameter is appropriately selected in accordance with the joining pattern.

It suffices that XY stage 110 is configured to support first member 111 and second member 112, and XY stage 110 may be similar to the XY apparatus of a common laser irradiation apparatus. Note that XY stage 110 may operate in conjunction with a supporting unit (not illustrated) for controlling the relative position of first member 111 and second member 112 for controlling the relative position of first member 111 and second member 112. It suffices that the supporting unit is configured to support and move first member 111 and/or second member 112 such that they are in a desired positional relationship. In addition, the configuration of the position control unit (not illustrated) for adjusting the position of the supporting unit and the position of XY stage 110 is not limited, and may be a computer or the like.

In addition, regarding temperature measurement unit 150, the temperature measurement means is not limited as long as the temperature at the irradiation positions of first light 123 from first light irradiation system 120 and second light 133 from second light irradiation system 130 (the contact portions of first member 111 and second member 112) can be measured. Temperature measurement unit 150 may be a radiative thermometer or the like, for example.

The configuration of light quantity control unit 160 is not limited as long as the temperature measured by temperature measurement unit 150 can be acquired and the outputs of first light irradiation system 120 and second light irradiation system 130 can be adjusted based on the temperature. For example, it may be a computer or the like. Note that one computer may serve as both light quantity control unit 160 and the above-described position control unit.

In the case where first member 111 and second member 112 are joined to each other by using processing apparatus 100, first member 111 (in FIG. 1, first member 111 and second member 112) is disposed on XY stage 110. Then, first light 123 is emitted from first light irradiation system 120. At this time, with lens 140, first light 123 is focused at the resin of first member 111 (in FIG. 1, the contact portions of first member 111 and second member 112).

In addition, almost simultaneously with the irradiation with first light 123 using first light irradiation system 120, second light 133 is emitted from second light irradiation system 130. Then, with lens 140, second light 133 is also focused at second light irradiation system 130 (in FIG. 1, the contact portions of first member 111 and second member 112).

Then, the temperature of the resin irradiated with the first light and the second light is measured by using temperature measurement unit 150. Light quantity control unit 160 determines whether the temperature measured by temperature measurement unit 150 is not less than the glass transition temperature of the resin in first member 111, and adjusts the outputs of the light of first light irradiation system 120 and the light of second light irradiation system 130 on the basis of the determination result. At this time, the above-described position control unit (not illustrated) may move XY stage 110 as necessary so as to perform the irradiation with first light 123 and second light 133 in a desired pattern.

Note that while the irradiations with first light 123 and second light 133 are performed in the same direction in the manufacturing apparatus illustrated in FIG. 1, the directions of the irradiations with first light 123 and second light 133 may be different from each other. In addition, while in the apparatus illustrated in FIG. 1, the irradiation with first light 123 and second light 133 is performed with first member 111 and second member 112 disposed in contact with each other, first member 111 second member 112 may be overlaid by using the supporting unit such that they are joined after irradiation with first light 123 and second light 133 is performed with only first member 111 disposed on XY stage 110.

3. Method of manufacturing Resin Component

A method of manufacturing a resin component of the embodiment of the present invention includes a step of performing irradiation with the first light of the first wavelength that electronically excites the resin of the first member including the resin, and a step of irradiating the resin electronically excited by the irradiation with the first light with the second light of the second wavelength longer than the first wavelength. It suffices that the wavelength range of the second wavelength is included in the wavelength range in which the light absorption of the resin increases through the electronic excitation of the resin, but it is preferable that the wavelength range of the second wavelength be the wavelength range in which the light absorption of the resin increases due to the increase in temperature of the resin included in the first member due to electronic excitation of the resin.

Examples of the resin component manufactured by the method of manufacturing the resin component of the embodiment of the present invention include a component manufactured by processing a resin, a component a produced by cutting a resin, a component with a groove formed in a resin, and a component obtained by joining resins. Examples of a component created by cutting a resin and a component with a groove formed in a resin include a resin container such as a beverage container and a food container, and a reflector of a backlight. Examples of a component obtained by joining resins include a pipe for passing gases and liquids. In addition, the resin component may include a part composed of a material other than resin. Specifically, examples of the resin component include a component composed of resin and a material other than resin such as metal and ceramic are joined. Examples of a component composed of resin and a material other than resin such as metal and ceramic are joined include a mechanical component such as a decoration screw, and an electronic component such as a fuse and a connector.

Figure 3:
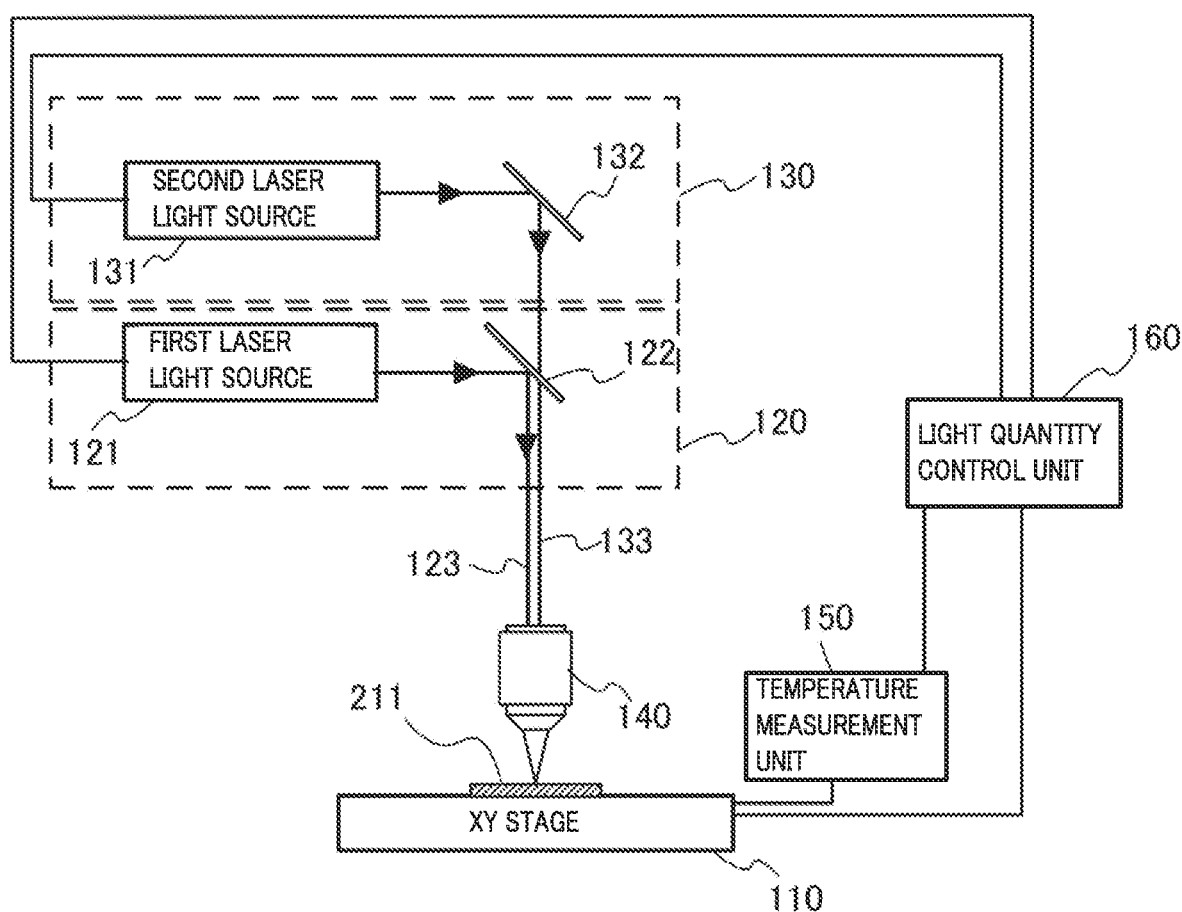
FIG. 3 is a schematic view for describing a method of manufacturing a resin component.

An example of a method of manufacturing a resin component of the embodiment of the present invention is illustrated in FIG. 3. The manufacturing method includes a method in which the first light irradiation step and the second light irradiation step are performed on first member 211 including resin. For first member 211, the same member as first member 111 may be used.

The manufacturing method includes, for example, a method of manufacturing a resin component by performing the first light irradiation step and the second light irradiation step on first member 211 including the resin and forming a groove with a desired shape in first member 211. In addition, the method of manufacturing a resin component includes, for example, a method of manufacturing a resin component by performing the first light irradiation step and the second light irradiation step on first member 211 including the resin, and cutting first member 211 into a desired shape. Note that apparatus (resin component manufacturing apparatus) 200 used for the method of manufacturing a resin component is the same as processing apparatus 100 except that first member 211 is processed in a desired manner by irradiating first member 211 with the first light and/or the second light. The same configurations as those of processing apparatus 100 are denoted with the same reference numerals, and the detailed description thereof is omitted.

Another example of the method of manufacturing a resin component of the embodiment of the present invention, is a method of performing a step of preparing the second member, and a step of joining the first member and the second member by bringing the region irradiated with the first light and the second light in the first member and the second member, in addition to the step irradiation with the first light and the step of irradiation with the second light. With this method, the first member and the second member can be joined to each other, and a resin component composed of resins joined to each other, a resin component composed of a resin and a material other than resins such as metal and ceramic are joined to each other and the like can be manufactured. In the case where a resin component composed of resins joined to each other is manufactured, examples of the first member and the second member include a resin pipe, and the resin component is a pipe composed of the resin pipes joined each other. In the case where a resin component composed of a resin and metal other than resins joined to each other is manufactured, examples of the first member include a head made of a resin, and examples of the second member include a screw portion made of metal. In this case, the resin component is a decoration screw composed of the resin head and the metal screw portion joined to each other. In addition, in the case where a resin component composed of a resin and metal other than resins joined to each other is manufactured, examples of the first member include a resin housing and a resin case, and examples of the second member include a metal terminal. Note that the step of irradiation with the second light, and the step of joining the first member and the second member may be simultaneously performed.

In the method of manufacturing a resin component of the embodiment of the present invention, the first light irradiation step, the second light irradiation step, and the joining step are the same as the steps described for the processing method for a resin member. Further, the first member and the second member used for the method of manufacturing a resin component may be the same as the first member and the second member described for the processing method for a resin member. Therefore, detailed description thereof is omitted.

EXAMPLES

The present invention is elaborated below with Examples, but the present invention is not limited to these examples.

Reference Example 1

Demonstration of Increased Light Absorption (Hot Band)

With a PET plate (thickness: 1 mm), the light absorption spectrum in a wavelength range of 350 to 500 nm was measured at room temperature and 65° C., and the results were compared. As a result, in the light absorption spectrum measured at 65° C., the light absorption was increased on the long wavelength side, especially the light absorbance in the wavelength range of 380 nm or greater was increased in comparison with the light absorption spectrum measured at room temperature. This result shows that increased light absorption (hot band) was caused in the PET plate.

Reference Example 2

Demonstration of Increase in Temperature of Resin Due to Laser Light Irradiation A PET plate, a PMMA plate, and a PC (polycarbonate) plate were irradiated with semiconductor laser light with a wavelength of 405 nm alone at an output of 300 mW, and the temperature of the portion irradiated with the laser light at this time was measured. As a result, in the PET plate and the PMMA plate, almost no temperature rise was confirmed. In the PC (polycarbonate) plate, a temperature rise was confirmed, but the temperature was not increased to a temperature required for the use of resin processing such as welding. This result shows that PET, PMMA, and PC (polycarbonate) do not have substantial light absorption for laser light of a wavelength of 405 nm.

Note that in this specification, "not have substantial light absorption" include a state in which it has a slight light absorption. In addition, "not have light absorption" also means "not have substantial light absorption". For example, the resin does not have substantial light absorption when the resin is irradiated with laser light with an output of 300 mW, the temperature of the resin does not exceed the glass transition temperature due to absorption of the laser light, as in Reference Example 2.

Comparative Example 1

A PET plate was irradiated with semiconductor laser light (continuous oscillated type) with a wavelength of 375 nm alone, and the temperature of the irradiated region was measured. Note that the focusing light irradiation system was a single lens (f=40 to 100 mm), and the light focusing spot diameter was 1 mm or less. Further, the temperature measurement was real time measurement using a radiative thermometer. Results are shown in Table 1.

Results

TABLE 1

| Output of Laser Light [mW] | Temperature of Irradiated Portion [° C.] |
| --- | --- |
| 0 | 24.3 |
| 100 | 27.8 |
| 200 | 37.5 |
| 300 | 49.2 |
| 400 | 67.5 |

When joining (welding) resins, it is necessary that the temperature of the resin of at least one member exceed the glass transition temperature ($T_g$).

The glass transition temperature of PET is 70° C. In view of this, as shown in Table 1, when the PET plate was irradiated with semiconductor laser light with a wavelength of 375 nm alone, the temperature of the resin was 67.5° C. even when the output was increased. That is, it did not reach the glass transition temperature of PET. In addition, even when two overlaid PET plates were disposed in contact with each other and 400 mW laser light of a wavelength of 375 nm was focused thereat, they were not joined.

Example 1

Condition 1

Two PET plates, a PET plate and a PC (polycarbonate) plate, or a PET plate and a PMMA plate were disposed in an overlaid manner.

At an overlapping portion of them, 400 mW laser light 1 (wavelength 375 nm) was focused while laser light 2 (wavelength 405 nm) with an output of 1000 mW was focused. Each laser light irradiation was performed from the PET plate side.

Note that the types of the laser light and the focusing light irradiation system used were as follows, and the temperature measurement was performed as follows.

Laser light 1: semiconductor laser light with a wavelength of 375 nm (continuous oscillated type)

Laser light 2: semiconductor laser light with a wavelength of 405 nm (continuous oscillated type)

Focusing light irradiation system: focusing light irradiation using a single lens (f=40 to 100 mm), with a light focusing spot diameter of 1 mm or less Temperature measurement: real time measurement using a radiative thermometer Result 1

After the irradiation with the laser light, the PET plates, the PET plate and the PC plate, and the PET plate and the PMMA plate were observed, and it was confirmed that all of them were joined (welded). In Comparative Example 1, the PET plates were not welded even when irradiated with the laser light of a wavelength of 375 nm alone, whereas the resin plates of two types were welded by using both the laser light of a wavelength of 375 nm and the laser light of a wavelength of 405 nm.

This result shows that the resin (mainly PET) was electronically excited through the irradiation with the laser light of a wavelength of 375 nm, and that a new light absorption band appeared on the longer wavelength side (around the wavelength 405 nm) than the wavelength 375 nm. Further, it can be said that through the irradiation with the laser light of two types, the temperature of the PET exceeded its glass transition point and thus the welding was achieved.

Condition 2

Two PC plates, or a PC plate and a PMMA plate were disposed in an overlaid manner. At an overlapping portion of them, 200 mW laser light 1 (wavelength 375 nm) was focused, while laser light 2 (wavelength 405 nm) with an output of 500 mW was focused. The laser light irradiation to the overlapping portion of the PC plate and the PMMA plate was performed from the PMMA plate side.

Note that the types of the laser light and the focusing light irradiation system used were as follows, and the temperature measurement was performed as follows.

- Laser light 1: semiconductor laser light with a wavelength of 375 nm (continuous oscillated type)
- Laser light 2: semiconductor laser light with a wavelength of 405 nm (continuous oscillated type)
- Focusing light irradiation system: focusing light irradiation using a single lens (f=40 to 100 mm), with a light focusing spot diameter of 1 mm or less
- Temperature measurement: real time measurement using a radiative thermometer Result 2

After the irradiation with the laser light, the overlapping portions of the PC plates, and the PC plate and the PMMA plate were observed, and it was confirmed that all of them were joined (welded).

This result shows that the resin (mainly PC) was electronically excited through the irradiation with the laser light of a wavelength of 375 nm, and that a new light absorption band appeared on the longer wavelength side (around the wavelength 405 nm) than the wavelength 375 nm. Further, it can be said that through the irradiation with the laser light of two types, the temperature of the PC exceeded its glass transition point and thus the welding was achieved.

Condition 3

Two PMMA plates were disposed in an overlaid manner. At the overlapping portion of them, 400 mW laser light 1 (wavelength 375 nm) was focused, while laser light 2 (wavelength 405 nm) with an output of 1000 mW was focused.

Note that the types of the laser light and the focusing light irradiation system used were as follows, and the temperature measurement was performed as follows.

- Laser light 1: semiconductor laser light with a wavelength of 375 nm (continuous oscillated type)
- Laser light 2: semiconductor laser light with a wavelength of 405 nm (continuous oscillated type)
- Focusing light irradiation system: focusing light irradiation using a single lens (f=40 to 100 mm), with a light focusing spot diameter of 1 mm or less
- Temperature measurement: real time measurement using a radiative thermometer Result 3

After the irradiation with the laser light, the overlapping portion of the PMMA plates was observed, and it was confirmed that they were joined (welded). This result shows that the resin (PMMA) was electronically excited through the irradiation with the laser light of a wavelength of 375 nm, and that a new light absorption band appeared on the longer wavelength side (around the wavelength 405 nm) than the wavelength 375 nm. Further, it can be said that through the irradiation with the laser light of two types, the temperature of the PMMA exceeded its glass transition point and thus the welding was achieved.

Example 2

Condition 1

A PET plate (thickness: 1 mm) was irradiated with laser light 1 (wavelength 375 nm) with an output of 200 mW, and the temperature of the irradiation portion was increased to 40° C. Then, the same irradiation portion was further irradiated with laser light 2 (semiconductor laser light with a wavelength of 405 nm) with an output of 500 mW while irradiating it with laser light 1, and the temperature of the irradiation portion was measured.

Note that the types of the laser light and the focusing light irradiation system used were as follows, and the temperature measurement was performed as follows.

- Laser light 1: semiconductor laser light with a wavelength of 375 nm (continuous oscillated type)
- Laser light 2: semiconductor laser light with a wavelength of 405 nm (continuous oscillated type)
- Focusing light irradiation system: focusing light irradiation using a single lens (f=40 to 100 mm), with a light focusing spot diameter of 1 mm or less
- Temperature measurement: real time measurement using a radiative thermometer Result 1

Through the irradiation with laser light 2, the temperature of the PET plate was increased to 110° C. (increased temperature $\Delta T=85°$ C.). This temperature is greater than the glass transition temperature (70° C.) of the PET, and therefore it can be said that the PET can be processed.

Condition 2

A PET plate (thickness: 1 mm) was irradiated with laser light 1 (wavelength 375 nm) with an output of 200 mW or less, and the temperature of the irradiation portion was increased to 60° C. Then, the same irradiation portion was irradiated with laser light 2 (wavelength 405 nm) with an output of 500 mW while irradiating it with laser light 1, and the temperature of the irradiation portion was measured. Note that the type of the laser light, the type of the focusing light irradiation system, and the temperature measurement method were the same as those of Condition 1.

Result 2

Through the irradiation with laser light 2, the temperature of the irradiation portion was increased to 125° C. (increased temperature $\Delta T=100°$ C.). This temperature is greater than the glass transition temperature (70° C.) of the PET, and therefore it can be said that the PET can be processed.

Example 3

Condition 1

Figure 4:
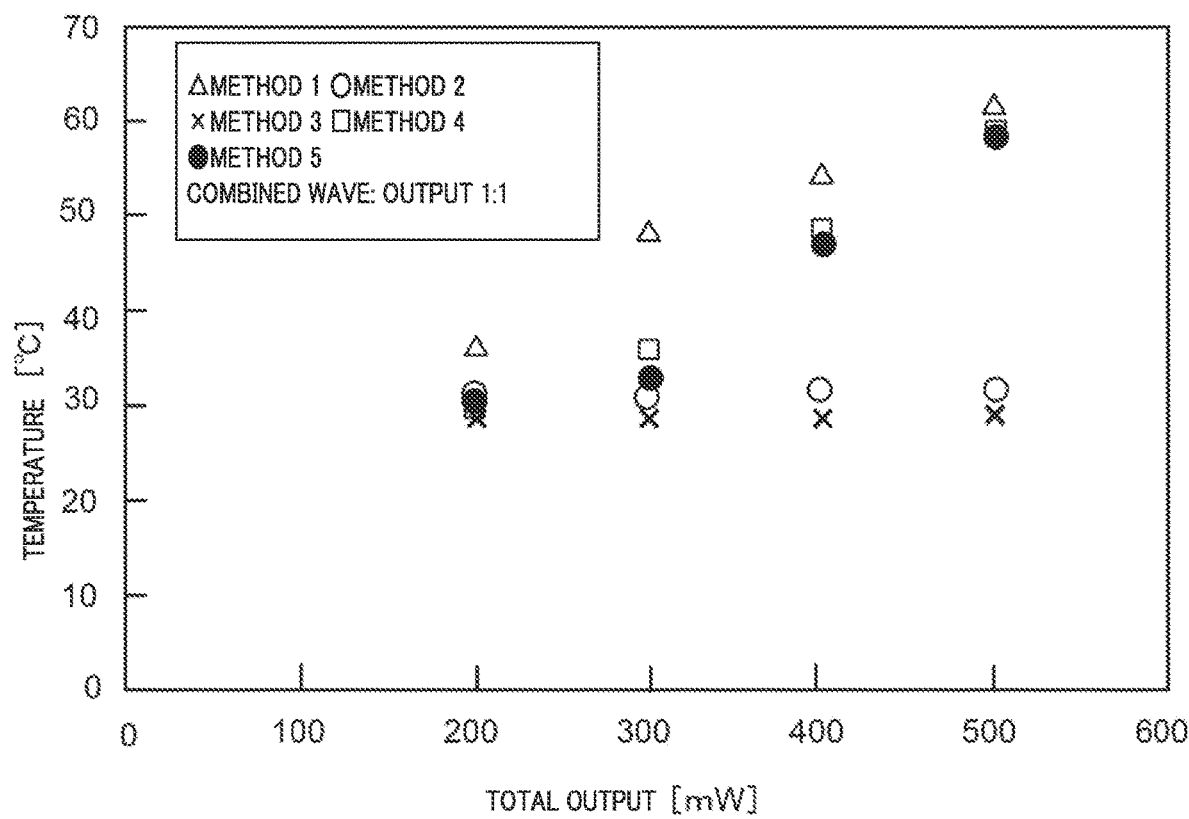
FIG. 4 illustrates a relationship between the total output of laser light and the temperature of the PET plate when a PET plate is irradiated with laser light in Example 3 of the embodiment of the present invention.

A PET plate (thickness: 1 mm) was irradiated with laser light in the following five methods, and the temperature of the irradiation portion was measured. The relationship between the temperature of the irradiation portion and the laser light sum total output is illustrated in FIG. 4. More specifically, in FIG. 4, Method 4 and Method 5 in which irradiation with a combination of laser light of two different wavelength types was performed and the temperature of the irradiation portion was measured are illustrated as examples. Method 1, Method 2, and Method 3 in which irradiation with only a laser of one type was performed and the temperature of the irradiation portion was measured are illustrated as comparative examples.

- Method 1 (comparative example): irradiation with only laser light 1 (wavelength 375 nm)
- Method 2 (comparative example): irradiation with only laser light 2 (wavelength 405 nm)
- Method 3 (comparative example): irradiation with only laser light 3 (wavelength 450 nm)

Method 4 (example): irradiation with laser light 1 (wavelength 375 nm) and laser light 2 (wavelength 405 nm) simultaneously at equal output Method 5 (example): irradiation with laser light 1 (wavelength 375 nm) and laser light 3 (wavelength 450 nm) simultaneously at equal output For Method 4 and Method 5 using lasers of two types, the sum of the outputs of the laser light of the two types is the total output. For example, in the case where the total output in Method 4 was 200 mW, the outputs of laser light 1 and laser light 2 are each 100 mW.

Note that the types of the laser light and the focusing light irradiation system used were as follows, and the temperature measurement was performed as follows.

Laser light 1: semiconductor laser light with a wavelength of 375 nm (continuous oscillated type)

Laser light 2: semiconductor laser light with a wavelength of 405 nm (continuous oscillated type)

Laser light 3: semiconductor laser light with a wavelength of 450 nm (continuous oscillated type)

Focusing light irradiation system: focusing light irradiation using a single lens (f=40 to 100 mm), with a light focusing spot diameter of 1 mm or less Temperature measurement: real time measurement using a radiative thermometer Result 1

As illustrated in FIG. 4, the temperature of the PET plate was not substantially changed with Method 2 in which it is irradiated with laser light 2 (wavelength 405 nm) alone, and Method 3 in which it is irradiated with laser light 3 (wavelength 450 nm) alone. On the other hand, the temperature of the PET plate was largely increased with Method 4 in which it is irradiated with a combination of laser light 1 (wavelength 375 nm) and laser light 2 (wavelength 405 nm), and Method 5 in which it is irradiated with a combination of laser light 1 (wavelength 375 nm) and laser light 3 (wavelength 450 nm). Temperature rise was confirmed in Method 1 in which it is irradiated with laser light 1 (wavelength 375 nm) alone, but as described later, Method 1 requires relatively large power since the light conversion efficiency of ultraviolet laser light such as laser light 1 is low.

Condition 2

Figure 5:
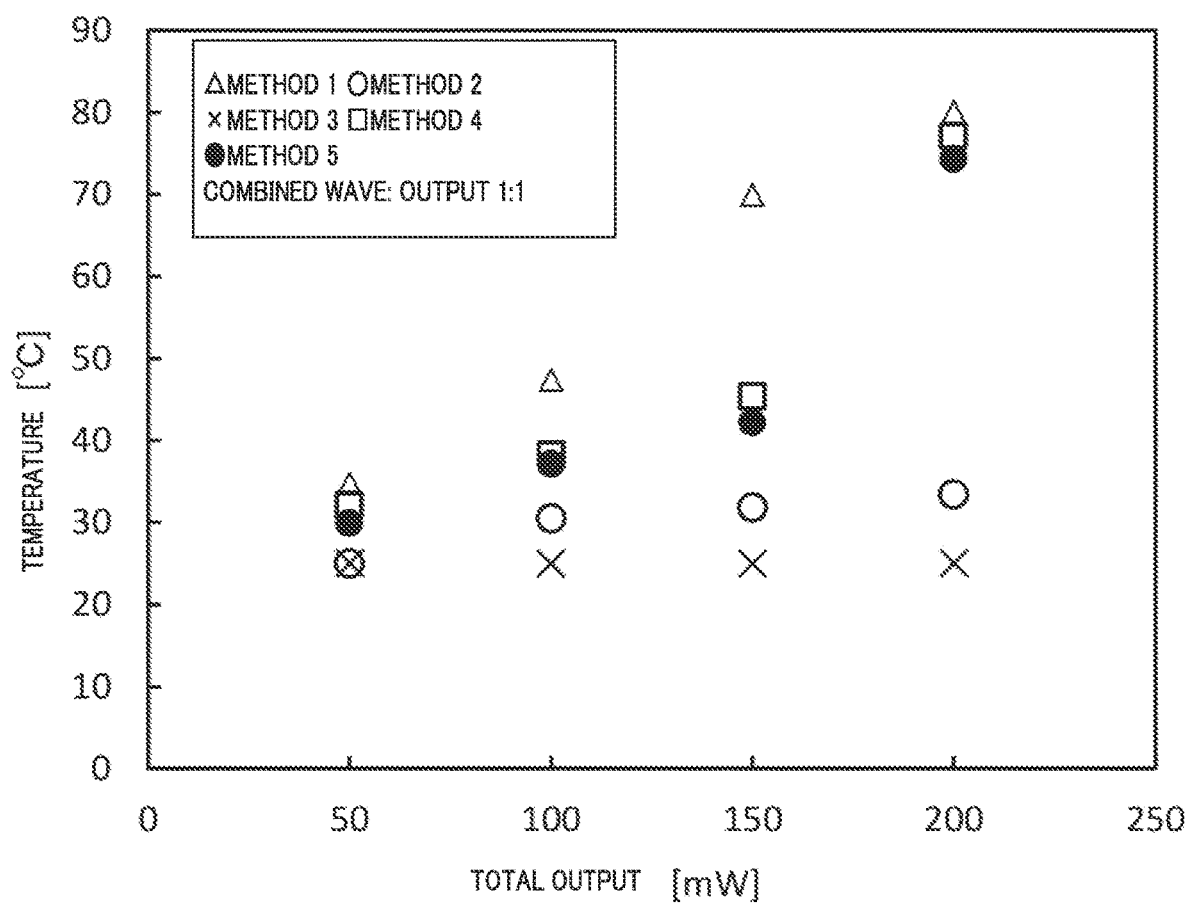
FIG. 5 illustrates a relationship between the total output of laser light and the temperature of the PC plate when a PC plate irradiated with laser light in Example 3 of the embodiment of the present invention.

A PC plate (thickness: 5 mm) was irradiated with laser light in the following five methods, and the temperature of the irradiation portion was measured. The relationship between the temperature of the irradiation portion and the laser light sum total output is illustrated in FIG. 5. More specifically, in FIG. 5, Method 4 and Method 5 in which irradiation with a combination of laser light of two different wavelength types was performed and the temperature of the irradiation portion was measured are illustrated as examples. Method 1, Method 2, and Method 3 in which irradiation with only a laser of one type was performed and the temperature of the irradiation portion was measured are illustrated as comparative examples.

Method 1 (comparative example): irradiation with only laser light 1 (wavelength 375 nm)

Method 2 (comparative example): irradiation with only laser light 2 (wavelength 405 nm)

Method 3 (comparative example): irradiation with only laser light 3 (wavelength 450 nm)

Method 4 (example): irradiation with laser light 1 (wavelength 375 nm) and laser light 2 (wavelength 405 nm) simultaneously at equal output Method 5 (example): irradiation with laser light 1 (wavelength 375 nm) and laser light 3 (wavelength 450 nm) simultaneously at equal output For Method 4 and Method 5 using lasers of two types, the sum of the outputs of the laser light of the two types is the total output. For example, in the case where the total output in Method 4 is 50 mW, the outputs of laser light 1 and laser light 2 are each 25 mW.

Note that the types of the laser light and the focusing light irradiation system used were as follows, and the temperature measurement was performed as follows.

Laser light 1: semiconductor laser light with a wavelength of 375 nm (continuous oscillated type)

Laser light 2: semiconductor laser light with a wavelength of 405 nm (continuous oscillated type)

Laser light 3: semiconductor laser light with a wavelength of 450 nm (continuous oscillated type)

Focusing light irradiation system: focusing light irradiation using a single lens (f=40 to 100 mm), with a light focusing spot diameter of 1 mm or less Temperature measurement: real time measurement using a radiative thermometer Result 2

As illustrated in FIG. 5, the temperature of the PC plate was not substantially changed with Method 2 in which it is irradiated with laser light 2 (wavelength 405 nm) alone, and Method 3 in which it is irradiated with laser light 3 (wavelength 450 nm) alone. On the other hand, the temperature of the PC plate was largely increased with Method 4 in which it is irradiated with a combination of laser light 1 (wavelength 375 nm) and laser light 2 (wavelength 405 nm), and Method 5 in which it is irradiated with a combination of laser light 1 (wavelength 375 nm) and laser light 3 (wavelength 450 nm). Temperature rise was confirmed in Method 1 in which it is irradiated with laser light 1 (wavelength 375 nm) alone, but as described later, Method 1 requires relatively large power since the light conversion efficiency of ultraviolet laser light such as laser light 1 is low.

Condition 3

Figure 6:
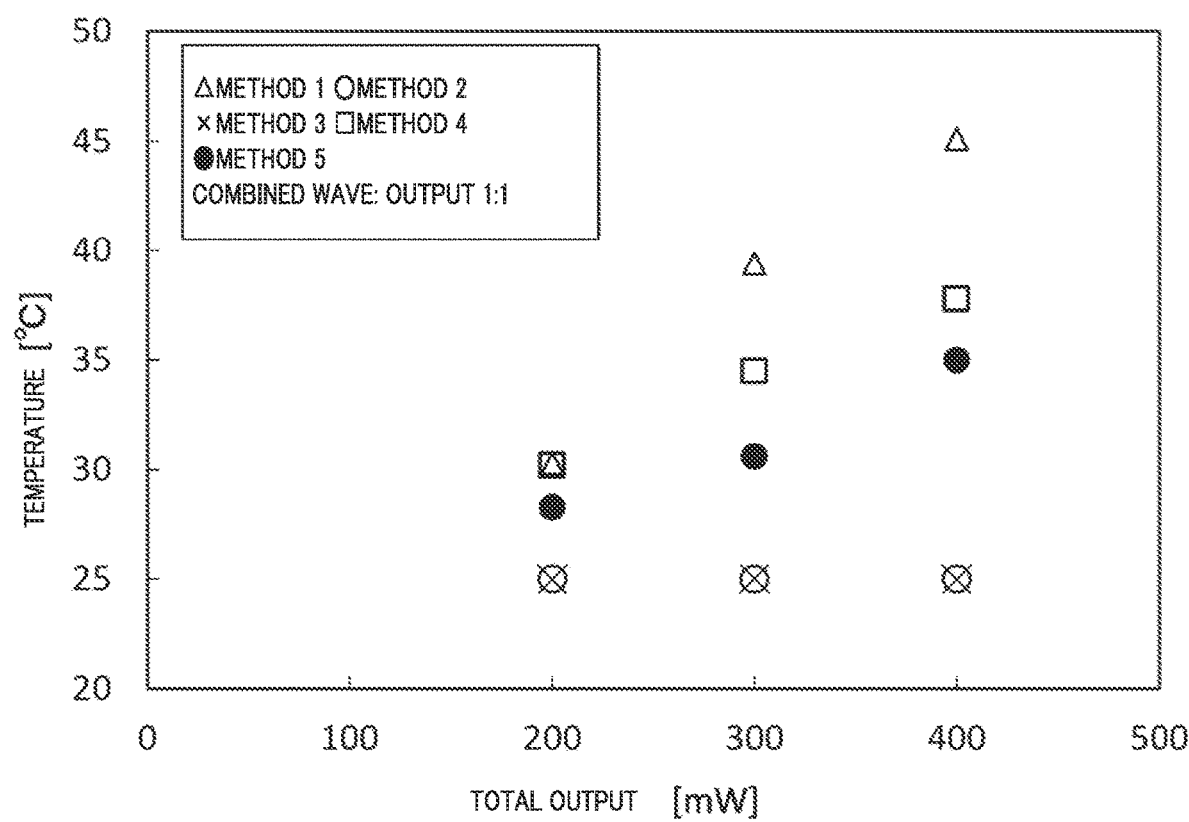
FIG. 6 illustrates a relationship between the total output of the laser light and the temperature of the PMMA plate when a PMMA plate is irradiated with laser light in Example 3 of the embodiment of the present invention.

APMMA plate (thickness: 5 mm) was irradiated with laser light in the following five methods, and the temperature of the irradiation portion was measured. The relationship between the temperature of the irradiation portion and the laser light sum total output is illustrated in FIG. 6. More specifically, in FIG. 6, Method 4 and Method 5 in which irradiation with a combination of laser light of two different wavelength types was performed and the temperature of the irradiation portion was measured are illustrated as examples. Method 1, Method 2, and Method 3 in which irradiation with only a laser of one type was performed and the temperature of the irradiation portion was measured are illustrated as comparative examples.

Method 1 (comparative example): irradiation with only laser light 1 (wavelength 375 nm)

Method 2 (comparative example): irradiation with only laser light 2 (wavelength 405 nm)

Method 3 (comparative example): irradiation with only laser light 3 (wavelength 450 nm)

Method 4 (example): irradiation with laser light 1 (wavelength 375 nm) and laser light 2 (wavelength 405 nm) simultaneously at equal output Method 5 (example): irradiation with laser light 1 (wavelength 375 nm) and laser light 3 (wavelength 450 nm) simultaneously at equal output For Method 4 and Method 5 using lasers of two types, the sum of the outputs of the laser light of the two types is the total output. For example, in the case where the total output in Method 4 was 200 mW, the outputs of laser light 1 and laser light 2 are each 100 mW.

Note that the types of the laser light and the focusing light irradiation system used were as follows, and the temperature measurement was performed as follows.

Laser light 1: semiconductor laser light with a wavelength of 375 nm (continuous oscillated type)

Laser light 2: semiconductor laser light with a wavelength of 405 nm (continuous oscillated type)

Laser light 3: semiconductor laser light with a wavelength of 450 nm (continuous oscillated type)

Focusing light irradiation system: focusing light irradiation using a single lens (f=40 to 100 mm), with a light focusing spot diameter of 1 mm or less Temperature measurement: real time measurement using a radiative thermometer Result 3

As illustrated in FIG. 6, the temperature of the PMMA plate was not substantially changed with Method 2 in which it is irradiated with laser light 2 (wavelength 405 nm) alone, and Method 3 in which it is irradiated with laser light 3 (wavelength 450 nm) alone. On the other hand, the temperature of the PMMA plate was largely increased with Method 4 in which it is irradiated with a combination of laser light 1 (wavelength 375 nm) and laser light 2 (wavelength 405 nm), and Method 5 in which it is irradiated with a combination of laser light 1 (wavelength 375 nm) and laser light 3 (wavelength 450 nm). Temperature rise was confirmed in Method 1 in which it is irradiated with laser light 1 (wavelength 375 nm) alone, but as described later, Method 1 requires relatively large power since the light conversion efficiency of ultraviolet laser light such as laser light 1 is low.

From Results 1 to 3 in Example 3, light in the visible light range, which is not inherently absorbed by resins, can also be used in the processing method of the embodiment of the present invention. In addition, in general, the light conversion efficiency of ultraviolet laser light is low. As such, relatively large power is required for achieving high output of ultraviolet laser light. With the processing method of the embodiment of the present invention, the output of ultraviolet laser with a low light conversion efficiency can be reduced, and therefore the resin member can be efficiently processed while suppressing the power consumption. In addition, ultraviolet laser elements have a low light conversion efficiency, and easily cause the temperature rise, and consequently, entail the risk of the damage to elements due to temperature rise. As a measure against the damage to the element due to temperature rise, it is conceivable to use a plurality of ultraviolet laser elements to achieve a desired output while reducing the damage to each ultraviolet laser element.

However, with the processing method of the embodiment of the present invention, the output of the ultraviolet laser light required for the processing can be reduced, and the number of ultraviolet laser elements can be reduced.

In addition, since the temperature of the resin can be increased without including a light absorber in the resin or applying a light absorber on the surface of the resin, the cost of the resin processing can be reduced in comparison with the case where the light absorber is used.

This application is entitled to and claims the benefit of Japanese Patent Application No. 2019-239647 filed on Dec. 27, 2019, the disclosure each of which including the specification, drawings and abstract is incorporated herein by reference in its entirety.

With the processing method according to certain embodiments of the present invention, a member including a resin can be processed by absorbing a sufficient quantity of light at a desired region of the member and raising its temperature. Therefore, it is a technique very useful for manufacture of various electronic components and devices, for example.

REFERENCE CHARACTER LIST

100 Processing apparatus
110 XY stage
111, 211 First member
112 Second member
120 First light irradiation system
121 First laser light source
122 First mirror
123 First light
130 Second light irradiation system
131 Second laser light source
132 Second mirror
133 Second light
140 Lens
150 Temperature measurement unit
160 Light quantity control unit
200 Resin component manufacturing apparatus

The invention claimed is:

1. A method for processing a resin member, the method comprising:
   irradiating a first member comprising a resin with first light of a first wavelength that causes electronic excitation of the resin, wherein the first wavelength is 375 nm or greater and 410 nm or less; and
   irradiating the resin electronically excited through irradiation with the first light with second light of a second wavelength longer than the first wavelength, wherein a wavelength range of the second wavelength is within a wavelength range in which light absorption of the resin increases through electronic excitation of the resin.

2. The method according to claim 1, further comprising:
   providing a second member; and
   joining the first member and the second member by bringing the second member and a region of the first member irradiated with the first light and the second light into contact with each other.

3. The method according to claim 2, wherein the step of irradiating with the second light and the step of joining the first member and the second member are simultaneously performed.

4. The method according to claim 2, wherein the wavelength range of the second wavelength is a wavelength range in which the light absorption of the resin increases due to temperature rise of the resin due to electronic excitation of the resin.

5. The method according to claim 2, wherein the wavelength range of the second wavelength is a wavelength range in which the light absorption of the resin increases due to an excited triplet state of the resin due to electronic excitation of the resin.

6. The method according to claim 2, wherein, in a state in which the resin has not been irradiated with the first light, the resin does not have absorption through electronic excitation for light of the second wavelength.

7. The method according to claim 2, wherein the step of irradiating with the first light and the step of irradiating with the second light are simultaneously performed.

8. The method according to claim 2, wherein the first light and the second light are laser light.

9. The method according to claim 2, wherein the second wavelength is greater than 400 nm and equal to or less than 550 nm.

10. The method according to claim 1, wherein the second wavelength is greater than 400 um and equal to or less than 550 um.

11. The method according to claim 10, wherein, in the step of irradiating with the first light and the step of irradiating with the second light, a temperature of a region irradiated with the first light and the second light in the first member is measured, and an intensity of the first light and an intensity of the second light are adjusted in accordance with the temperature of the region of the first member that is irradiated with the first light and the second light.

12. A processing apparatus for a resin member, the processing apparatus comprising:
a first light irradiation system configured to irradiate a resin of a first member with a first light of a first wavelength that causes electronic excitation of the resin, wherein the first wavelength is 375 nm or greater and 410 nm or less; and
a second light irradiation system configured to irradiate the resin of the first member with second light of a second wavelength longer than the first wavelength, wherein a wavelength range of the second wavelength is within a wavelength range in which a light absorption of the resin increases through electronic excitation of the resin.

13. The processing apparatus according to claim 12, further comprising:
a position control unit configured to control a relative position of the first member and a second member, wherein:
the position control unit is configured to join the second member and the first member irradiated with the first light and the second light from the first light irradiation system and the second light irradiation system.

14. The processing apparatus according to claim 13, wherein the wavelength range of the second wavelength is a wavelength range in which the light absorption of the resin increases clue to temperature rise of the resin clue to electronic excitation of the resin.

15. The processing apparatus according to claim 13, wherein the wavelength range of the second wavelength is a wavelength range in which the light absorption of the resin increases due to excited triplet state of the resin due to electronic excitation of the resin.

16. The processing apparatus according to claim 13, wherein the first light irradiation system and the second light irradiation system are configured to simultaneously perform irradiation with the first light and irradiation with the second light.

17. The processing apparatus according to claim 13, wherein the first light irradiation system and the second light irradiation system are configured to emit laser light.

18. The processing apparatus according to claim 13, wherein the second wavelength is greater than 400 nm and equal to or less than 550 nm.

19. The processing apparatus according to claim 12, wherein the first light irradiation system and the second light irradiation system are configured to irradiate an interface of the first member and a second member in a state in which the first member and the second member are disposed in contact with each other.

20. The processing apparatus according to claim 12, wherein the second wavelength is greater than 400 nm and equal to or less than 550 nm.

21. The processing apparatus according to claim 12, further comprising:
a temperature measurement unit; and
a light quantity control unit; wherein:
the temperature measurement unit is configured to measure a temperature of a region of the first member irradiated with the first light and the second light; and
the light quantity control unit is configured to adjust an intensity of the first light and the second light in accordance with the temperature measured by the temperature measurement unit.

22. A method for processing a resin component, the method comprising:
irradiating a first member comprising a resin with first light of a first wavelength that causes electronic excitation of the resin, wherein the first wavelength is equal to or greater than 375 nm and equal to or less than 410 nm; and
irradiating the resin electronically excited through irradiation with the first light with second light of a second wavelength longer than the first wavelength, wherein the second wavelength is greater than 400 nm and equal to or less than 550 nm, wherein:
a power output of the first light is smaller than a power output of the second light.

23. The method according to claim 22, further comprising:
providing a second member; and
joining the first member and the second member by bringing the second member and a region of the first member irradiated with the first light and the second light into contact with each other.

24. The method according to claim 23, wherein the step of irradiating with the second light and the step of joining the first member and the second member are simultaneously performed.

25. The method according to claim 23, wherein the wavelength range of the second wavelength is a wavelength range in which the light absorption of the resin increases due to temperature rise of the resin due to electronic excitation of the resin.

* * * * *

UNITED STATES PATENT AND TRADEMARK OFFICE
CERTIFICATE OF CORRECTION

PATENT NO. : 11,945,173 B2
APPLICATION NO. : 17/847928
DATED : April 2, 2024
INVENTOR(S) : Yuichi Asakawa et al.

It is certified that error appears in the above-identified patent and that said Letters Patent is hereby corrected as shown below:

In the Claims

Claim 10, Column 21, Lines 1-3:
Please delete:
"The method according to claim 1, wherein the second wavelength is greater than 400 um and equal to or less than 550 um."

Please replace with:
The method according to claim 1, wherein the second wavelength is greater than 400 nm and equal to or less than 550 nm.

Signed and Sealed this
Thirtieth Day of July, 2024

Katherine Kelly Vidal
*Director of the United States Patent and Trademark Office*